(12) United States Patent
Binning

(10) Patent No.: US 6,926,613 B1
(45) Date of Patent: Aug. 9, 2005

(54) POOL TABLE ASSEMBLY

(76) Inventor: Eric Gregory Binning, 45763 Clement Ct., Northville, MI (US) 48167

( * ) Notice: Subject to any disclaimer, the term of this patent is extended or adjusted under 35 U.S.C. 154(b) by 0 days.

(21) Appl. No.: 10/371,703

(22) Filed: Feb. 21, 2003

(51) Int. Cl.[7] .................. A63D 15/06; A63D 15/00; A63D 15/04; A47B 3/06; F16M 11/16
(52) U.S. Cl. .................. 473/31; 473/13; 108/158; 248/188; 403/345; 403/346; 403/231
(58) Field of Search .................. 473/31, 1, 3, 4, 473/6, 8, 9, 10, 11, 14, 32, 33; 403/217, 231, 403/345, 346; 273/309; 108/158; 248/188

(56) References Cited

U.S. PATENT DOCUMENTS

| | | | |
|---|---|---|---|
| 9,542 A | * | 1/1853 | Batchelor et al. .............. 72/194 |
| 245,516 A | * | 8/1881 | Langston .................... 403/217 |
| 280,198 A | * | 6/1883 | Ludwig ........................ 473/33 |
| 723,378 A | * | 3/1903 | Fuller ..................... 273/123 R |
| 851,493 A | * | 4/1907 | Castonguay ............. 273/317.9 |
| 1,220,236 A | * | 3/1917 | Kemp ......................... 473/13 |
| 1,516,654 A | * | 11/1924 | Treiber ....................... 473/31 |
| 2,371,329 A | * | 3/1945 | Hirsch ....................... 403/217 |
| 4,093,167 A | * | 6/1978 | Rooklyn ..................... 248/188 |
| 4,235,559 A | * | 11/1980 | Rooklyn ..................... 403/262 |
| 4,579,342 A | * | 4/1986 | Mortensen ..................... 473/3 |
| 4,632,473 A | * | 12/1986 | Smith ....................... 312/265.1 |
| 4,927,140 A | * | 5/1990 | Pappas ......................... 473/8 |
| 5,622,120 A | * | 4/1997 | Yeh ............................. 108/158 |
| 6,053,818 A | * | 4/2000 | McCormick .................. 473/4 |

* cited by examiner

*Primary Examiner*—Mitra Aryanpour
(74) *Attorney, Agent, or Firm*—Law Offices of John Chupa & Associates, P.C.

(57) ABSTRACT

A pool table (10) having a plurality of corner assemblies (12, 14, 16, and 18) which allow the pool table (10) to be easily disassembled while concomitantly allowing the pool table (10) to be sturdy.

8 Claims, 6 Drawing Sheets

POOL TABLE ASSEMBLY

FIELD OF THE INVENTION

The present invention generally relates to a pool table assembly and more particularly to a pool table assembly having corner assemblies which allow the pool table assembly to be structurally stable and secure while concomitantly allowing the pool table to be selectively and easily assembled and disassembled.

BACKGROUND OF THE INVENTION

A pool or billiard table is normally formed by the selective interconnection of a plurality of members which cooperatively form a frame or frame assembly upon which a playing surface is deployed. It should be realized that while a pool or billiard table is described in this application, the present inventions are applicable to a wide variety of tables, including but not limited to a pool or billiard table. That is, such a frame assembly is typically constructed from a series of rails which are coupled to a leg or corner member by a wide variety of techniques and assemblies, such as and without limitation, metal cleats, brackets, and screws. While these prior frame assemblies do allow for the formed table to remain stationary and do allow the table to be constructed, at least in an initially stable or stationary manner, they do suffer from some drawbacks.

By way of example and without limitation, these frame assemblies are not adapted to be easily disassembled and then reassembled. This is a particularly troublesome drawback when an owner of such a pool table moves from one house to another and is faced with the proposition of moving the pool table, in an assembled fashion, from the basement, up some stairs, through an entry door, and into a truck, and then moving the assembled pool table into the basement of the new house. The task is even more daunting when one considers that the pool table is not only large and bulky, but is quite heavy. Moreover, even if the homeowner successfully disassembles the pool table, it is quite difficult to reassemble it and, quite frequently, the pool table cannot be reassembled in a manner which allows the reassembled pool table to have the same structural sturdiness or strength as it previously had due to the degradation of the actual frame material which originally received the disassembled fasteners (i.e., the cleats and/or other items are oftentimes actually and directly received into the frame during original installation).

Further, these prior pool tables became structurally and progressively weaker over time (even though they may not have been disassembled) due to the degradation, over time, of the portion of the frame which actually receives the various fastener members and due to torque which is created at the corners of the frame. Particularly, the torque causes the members, which were initially joined at the, corners, to become loose, effective to, loosen the entire frame assembly.

Yet another drawback associated with these prior pool tables is based upon the use of many types and numbers of fasteners within these respective frame assemblies. These large numbers and types of fasteners not only undesirably increase the overall cost of producing these pool tables, they also increase the likelihood of structural failure and increase the overall complexity of producing these tables.

Further, the prior pool table production methodology requires a technician or assembler to "blindly." insert one or more of these fastener assemblies into a partially formed frame assembly and then "feel" or guess at the position of the inserted fastener assemblies, while attempting to blindly couple the visually hidden fastener assemblies to other assemblies in order to, complete the production process. This technique obviously and undesirably increases the likelihood of errant installation and may even cause injury to the installer.

The present invention overcomes these and other disadvantages which are associated with prior pool tables in a new and novel fashion.

SUMMARY OF THE INVENTION

It is a first non-limiting advantage of the present invention to provide a, playing table which overcomes some or all of the disadvantages of prior playing tables, such as but not limited to those disadvantages which have been delineated above.

It is a second non-limiting advantage of the present invention to provide a playing table which overcomes some or all of the disadvantages of prior playing tables and which, by way of example and without limitation, is structurally sound and stable.

It is a third non-limiting advantage of the present invention to provide a playing table which overcomes some or all of the disadvantages of prior playing tables and which, by way of example and without limitation, has a corner assembly which is structurally sound and which is adapted to allow the formed playing table to be structurally sound.

It is a fourth non-limiting advantage of the present invention to provide a playing table corner assembly. Particularly, the playing table corner assembly includes a first member having a first counter bore; a second member having a second counter bore; a block; a first dowel member which couples the first member to the corner block; a second dowel member which couples the second member to the corner block; a first fastener member which extends through the corner block and which resides within the first counter bore; a second fastener member which extends through the corner block and which resides within the second counter bore; a third fastener member which is selectively and removably coupled to the first fastener member and which selectively causes the first fastener member to remain resident within the first counter bore; a fourth fastener member which selectively causes the second fastener member to remain resident within the second counter bore.

It is a fifth non-limiting advantage of the present invention to provide a pool table assembly. Particularly, the provided pool table assembly includes a corner assembly comprising a leg member having a first, a second, a third, and a fourth face; a first rail member; a second rail member; and a fastening assembly which respectively couples the first and the second rail members to the first and the second faces of the leg member, and wherein the fastening assembly is effective to provide a compression force on each of the first, second, third, and fourth faces of the leg member, thereby providing a tight joint.

It is a sixth non-limiting advantage of the present invention to provide a pool table. Particularly, the provided pool table includes a corner assembly which comprises a leg member; a first rail member; a second rail member; and a fastener assembly which couples the first and second rail member to the leg member by providing compression force in a first and in a second plane, wherein each of the planes which pass through the leg member in a perpendicular manner.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
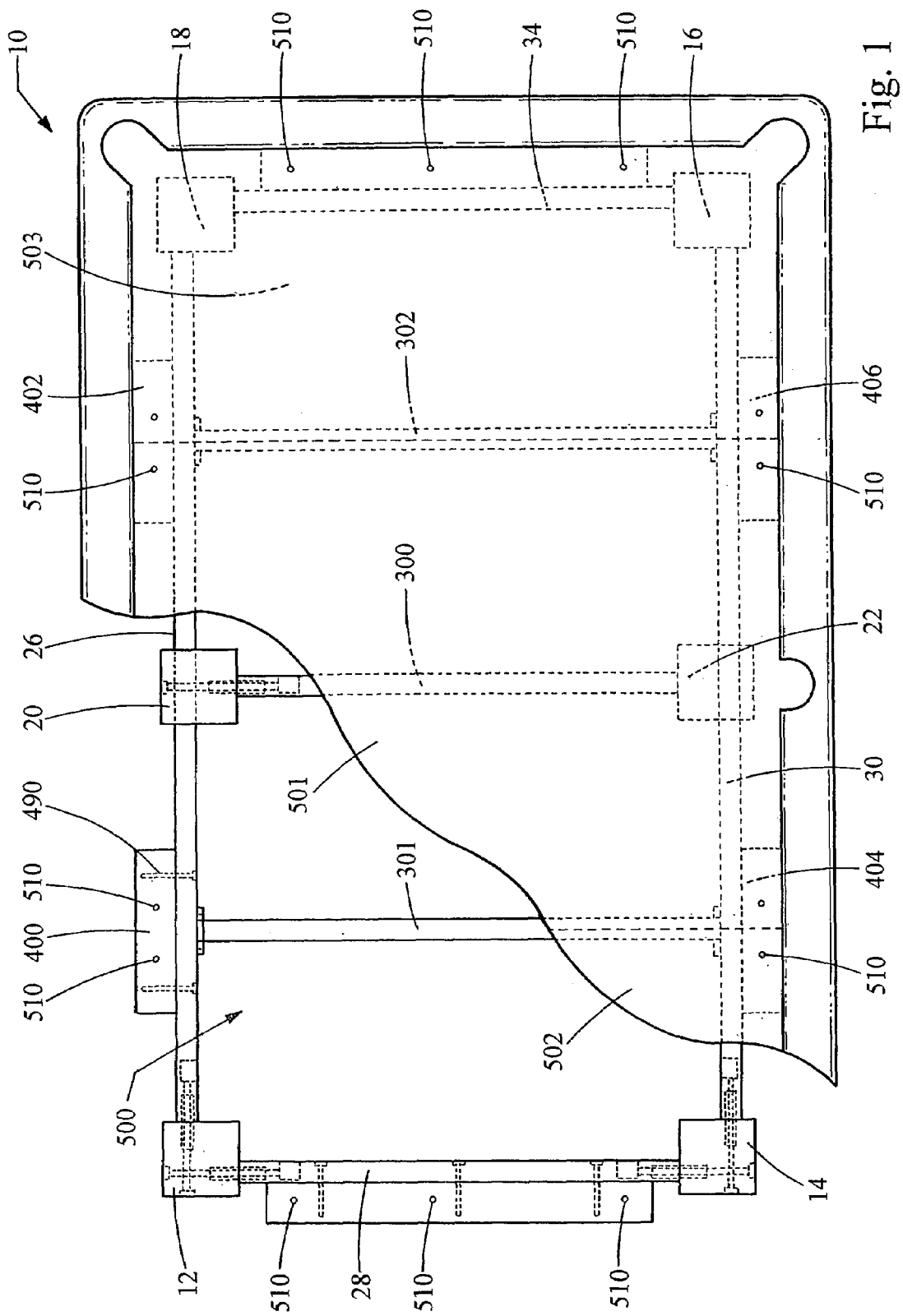
FIG. 1 is a top cut-away view of a pool table which is made in accordance with the teachings of the preferred embodiment of the invention.

Referring now to FIG. 1, there is shown a pool table assembly 10 which is made in accordance with the teachings of the preferred embodiment of the invention.

Particularly, pool table assembly 10 includes, in this one non-limiting embodiment, four substantially identical corner assemblies 12, 14, 16, and 18. The pool table assembly 10 further includes substantially identical outer rail members 26, 30 and 28, 34.

Figure 2:
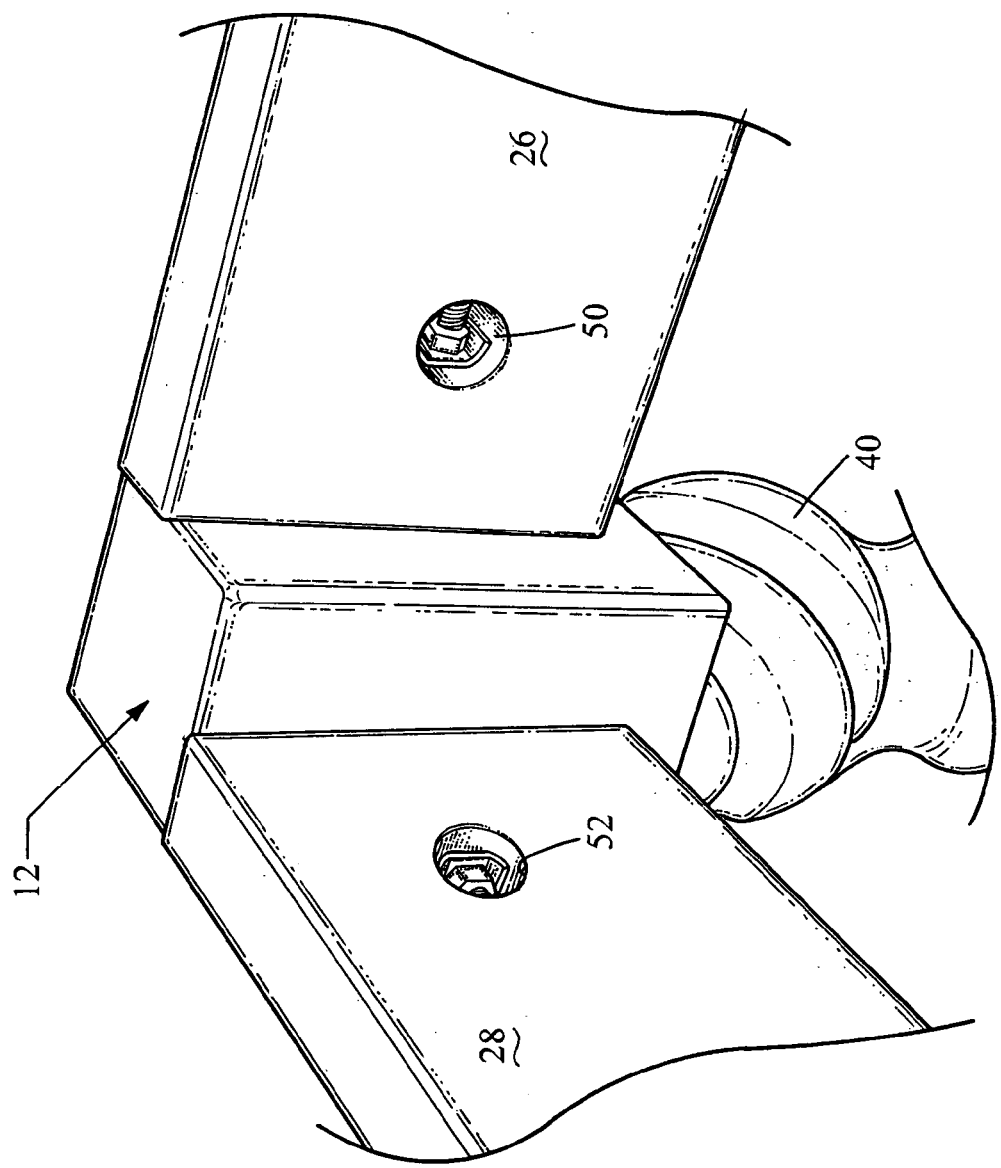
FIG. 2 is partial assembled and respective view of a corner portion of the pool table which is shown in FIG. 1.
Figure 3:
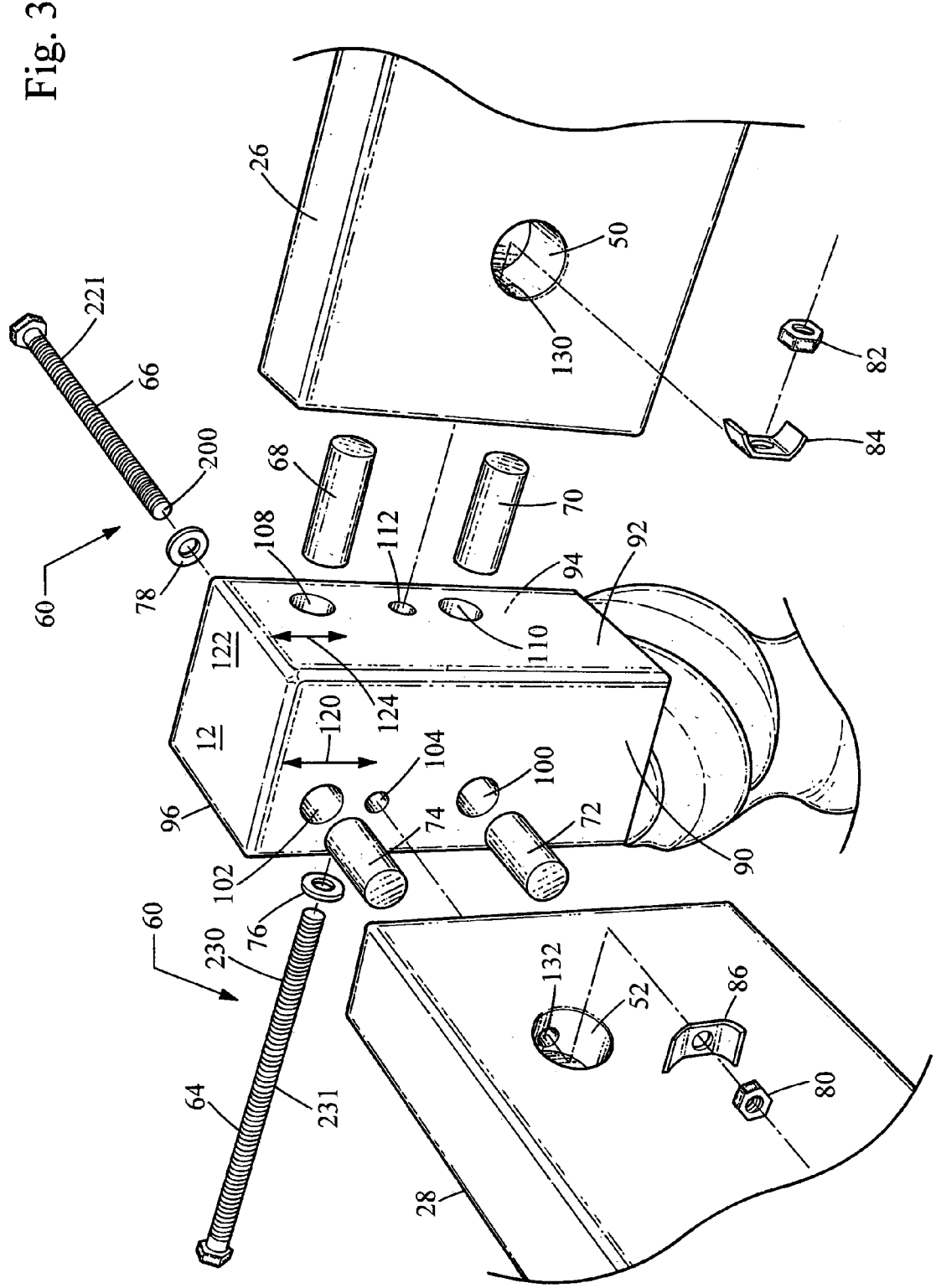
FIG. 3 is an unassembled view of the corner portion of the pool table which is shown in FIG. 2.
Figure 4:
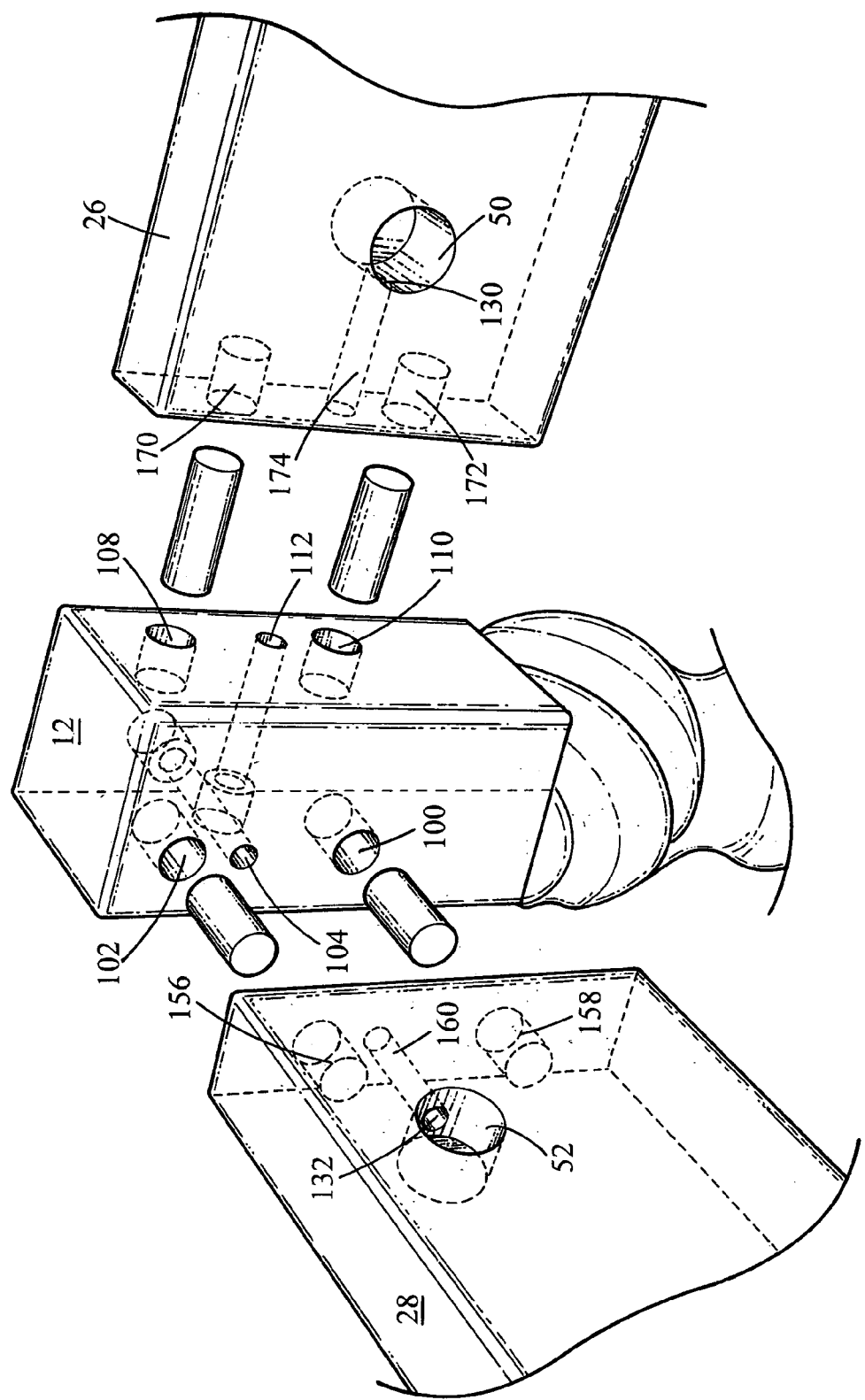
FIG. 4 is a view which is substantially similar to that which is shown in FIG. 3 but which also shows the various fastener reception bores within the various members which are shown in FIG. 3.
Figure 6:
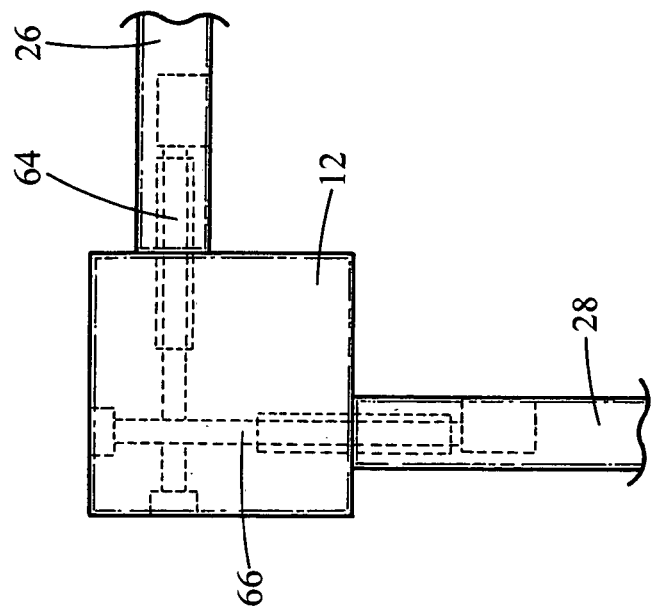
FIG. 6 is a top sectional view of the assembly which is shown in FIG. 2.
Figure 5:
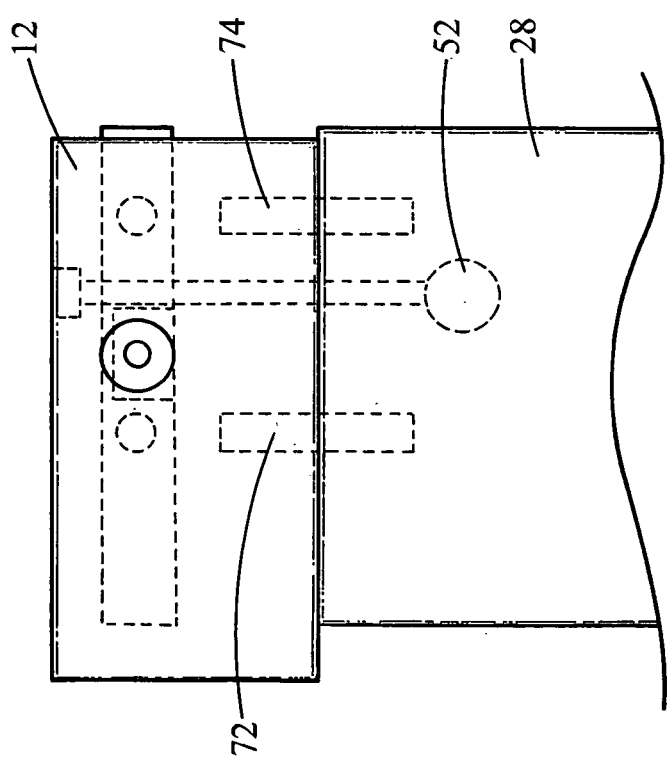
FIG. 5 is a sectional view of the assembly which is shown in FIG. 2 illustrating the various bores.
Figure 9:
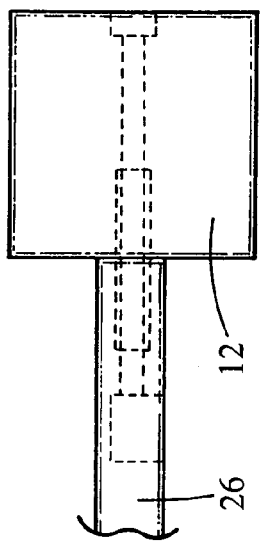
FIG. 9 is a sectional view of a portion of the pool table assembly which is shown in FIG. 1.
Figure 7:
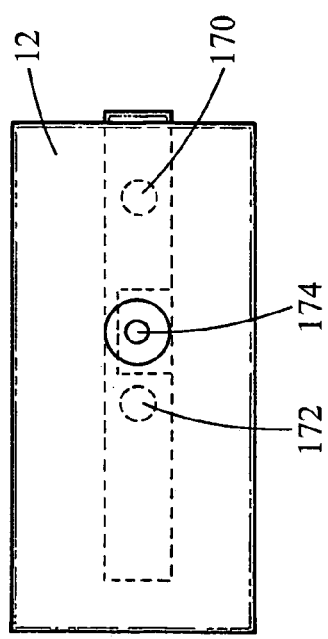
FIG. 7 is a sectional view of the assembly which is shown in FIG. 2 and which is taken along view line 7—7.
Figure 8:
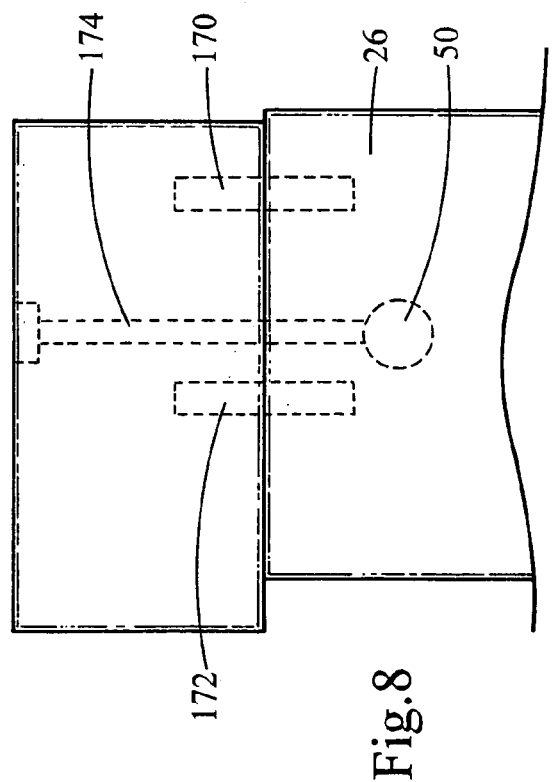
FIG. 8 is an assembled sectional view of a portion of the corner assembly which is shown in FIG. 2.

As best shown in FIGS. 2–4, each of the substantially identical outer rail members 26–34 has a substantially rectangular cross sectional area and is generally planar. Further, as shown, corner member 12 (as well as the other substantially identical corner members 14, 16, 18) has a generally rectangular cross sectional area and, in the most preferred although non-limiting embodiment of the invention, is integrally formed with a leg member 40. Alternatively, the corner member 12 may be attached to the leg member 40. Further, outer rail member 26 includes a first blind aperture or counter bore 50 and outer rail member 28 includes a second blind aperture or counter bore 52. In the most preferred embodiment of the invention, the counter bores 50, 52 are substantially identical in size and in shape and are circular. The outer rails 26, 28 are selectively attached to the corner member 12 by the use of a fastener assembly 60.

Particularly, fastener assembly 60 includes a pair of substantially identical and threaded members 64, 66, substantially identical dowel members 68, 70, 72, and 74, substantially identical washers 76, 78, substantially identical nuts 80, 82, and substantially identical radial washers 84, 86. Further, the corner member 12 has substantially identical flat faces 90, 92, 94, and 96. As shown, face 90 includes substantially identical dowel reception holes 100, 102 and a threaded member reception hole 104 which is disposed between the holes 100, 102. The face 92 includes substantially identical dowel reception holes 108, 110 and a threaded member reception hole 112 which is disposed between the dowel reception holes 108, 110. The distance 120 between the center of the hole 104 and the top surface 122 of the corner member 12 is shorter than the distance between the center of the hole 112 and the surface 122. In this manner, it should be apparent to one of ordinary skill in the art that hole 104 is "above" hole 112. Further, each counter bore 50, 52 includes a respective through aperture 13b, 132.

Further, the member 28 includes two dowel reception bores 156, 158 and a reception bore 160 which extends into the counter bore 52, thereby forming the aperture 132. Similarly, the member 26 includes two dowel reception bores 170, 172 and a reception bore 174 which extends into the counter bore 50 and which forms the aperture 130. As shown best in FIG. 4, the apertures 104, 112 extend through the corner member 12, thereby respectively forming bores within the corner member 12. The apertures 100, 102, 108, and 110 terminate within the corner member 12 and therefore respectively form blind apertures.

In assembly operation, the dowels 72, 74 are respectively placed within the apertures or bores 100, 102 and these dowels 72, 74 are then respectively received within the bores 156, 158. The placement of the dowels 72, 74 in this manner causes the bore 104 to be aligned with the bore 160. The "free" end 200 of the threaded member 66 is then placed through the washer 78 and inserted into the aligned bores 104, 160 and the free end 200 of the threaded member 66 is then made to protrude into the counter bore 52, through aperture 132. The radial washer 86 is then placed upon the protruding free end 200 and the nut 80 is placed on the protruding free end 200 and rotated upon the threads 221 of the member 66 until contacting the radial washer 86. In the foregoing manner, the member 28 is tightly but removably coupled to the corner member 12.

In similar fashion, the dowel members 68, 70 are respectively placed within the bores 108, 110 of the corner member 12. The protruding dowel members 68, 70 are then selectively placed within the bores 170, 172 of the member 26. In this manner, the aperture or bore 112 is aligned with the bore 174. The free end 230 of the threaded member 64 is then made to be received by the washer 76 and to be placed within and made to traverse bore 112 and bore 174, until protruding within the counter bore 50 through aperture 130. The radial washer 84 is then placed upon the protruding free end 230 and the nut 82 is placed upon the protruding free end 230 and turned about the threads 231, effective to cause the nut 82 to contact the radial washer 84. In the foregoing manner, the members 26, 28 are 15 securely and tightly attached to the corner member 12.

It should be appreciated that the fastener assembly 60 causes the corner member 12 to remain in compression and causes a compression force to be generated on all of the faces 90, 92, 94, and 96. Each of the other corner members 14, 16, and 18 are attached to respective outer members 28, 30; 30, 34; and 26, 34 in a substantially similar fashion.

In one non-limiting embodiment of the invention, transverse members 300, 301, and 302 may be employed along with middle members 20, 22. Alternatively, only the corner members 12, 14, 16, 18 and rail members 26, 30 are employed.

In this one non-limiting embodiment of the invention, middle member 20 receives outer rail member 26 and transverse member 300, while middle member 22 receives outer rail member 30 and transverse member 300. Particularly, members 20, 22 are each integrally formed with a leg member which is substantially similar to leg member 40 and members 30 and 300 are received by the middle member 22 in respectively the same manner as members 26 and 28 are received by corner member 12. Further, members 300 and 26 are received by the member 20 in respectively the same manner that the members 28, 26 are received by the corner member 12. For additional strength, slate support members 400, 402, 404, and 406 may be respectively attached to rail members 26, 26, 30, 32 and respectively form individual support members and, such attachment may be made by screws 490.

Hence, in the foregoing manner, the members 12, 14, 16, 18, 26, 28, 30, 34 form a sturdy frame upon which a playing surface 500 may be selectively and removably deployed.

It should be appreciated that the formed pool table assembly may be easily and selectively disassembled by removing the individual nuts 80, 82 and the threaded members 64, 66 from the various corner members. The dowels 68, 70, 72, 74 may then be easily removed and the outer rail members 26, 30 and 28, 34 may then be easily separated. The same technique may be used to remove the middle members 20, 22.

If the additional support members 400–404 are used, the entire pool table may be easily disassembled once the fasteners 510 (e.g., screws), holding the top surface 500 to the outer members 26, 28, 30, and 34, are removed. Further, it should be realized that the force created by the weight of the playing surface 500 and the rails 26, 28, 30, 34, 300, 301, and 302 is distributed directly into and through the corner members 12, 14, 16, 18 and middle members 20, 22, thereby obviating the need for a cleat or other mechanical fastener and/or attachment mechanism. Further, it should be appreciated that an installer may actually view the location of the ends 200, 232 of the members 64, 66 within the counter bores 50, 52, thereby allowing a relatively easy installation.

It should be further appreciated that, in other non-limiting embodiments of the invention, playing surface 500 may comprise three separate playing surfaces, such as and without limitation surfaces. 501, 502, 503 and, nothing in this description should be construed as limiting the playing surface 500 to only one playing surface. (i.e., playing surface 500 may comprise a traditional three-piece slate 501–503 which forms one uniform playing surface 500 when placed upon and fastened to outer rails 26, 28, 30, and 34.

It is to be understood that the invention is not limited to the exact construction or methodology which has been illustrated and described above, but that various changes and modifications may be made without departing from the spirit and the scope of the inventions as are more fully delineated in the following claims.

What is claimed is:

1. A pool table corner assembly comprising:
   a first rail member having a first counter bore including a first exposed aperture;
   a second rail member having a second counter bore including a second exposed aperture;
   a corner block;
   a first dowel member which couples said first rail member to said corner block;
   a second dowel member which couples said second rail member to said corner block;
   a first fastener member which extends through said corner block and which resides within said first counter bore while terminating within said first exposed apertures, thereby protruding outside of said first rail member, wherein said first fastener member has two opposed and exposed ends;
   a second fastener member which extends through said corner block and which resides within said second counter bore while terminating within said second exposed aperture, thereby protruding outside of said second rail member, wherein said second fastener member has two opposed and exposed ends;
   a third fastener member which is selectively and removably coupled to said first fastener member and which selectively causes said first fastener member to remain resident within said first counter bore by attaching to said protruding portion of said first fastener member; and
   a fourth fastener member which selectively causes said second fastener member to remain resident within said second counter bore, by attaching to said protruding portion of said second fastener member.

2. The pool table corner assembly of claim 1 wherein said first and second fastener members respectively comprise threaded members.

3. The pool table corner assembly of claim 2 wherein said third and fourth fastener members respectively comprise nuts.

4. The pool table corner assembly of claim 1 wherein said first fastener member resides above said second fastener member.

5. The pool table corner assembly of claim 4 further comprising a leg which is attached to said corner block.

6. The pool table corner assembly of claim 5 wherein said leg has a width which is substantially similar to the width of said corner member.

7. The pool table corner assembly of claim 6 wherein each of said first and second dowel members are substantially identical.

8. The pool table corner assembly of claim 7 wherein each of said third and fourth fastener members further and respectively comprise a radial washer.

* * * * *